May 11, 1943. L. W. SCHAAFF 2,318,636
APPARATUS FOR SWEETENING BREATH
Filed June 27, 1938

INVENTOR
Louis W. Schaaff.
BY
Robert I. Hulsizer
ATTORNEY

Patented May 11, 1943

2,318,636

UNITED STATES PATENT OFFICE 2,318,636

APPARATUS FOR SWEETENING BREATH

Louis W. Schaaff, Elmhurst, N. Y.

Application June 27, 1938, Serial No. 216,018

12 Claims. (Cl. 128—201)

This invention relates to a new and useful method and apparatus for sweetening the breath.

Its primary object is to provide a simple and efficient method and apparatus whereby the usual bad breath problems incident to our daily life may be easily and quickly solved and the bad breath eliminated in a few seconds and with practically no effort and without the use of dosing and medication and without having to chew anything or use gargles and mouth washes which are troublesome and very inconvenient to employ.

In connection with the development of my invention of breath tester set forth in my co-pending application Serial Number 426, filed August 17, 1937, I discovered that even after the usual breath sweetening remedies had been used, the breath when tested still proved to have at least some contamination and bad odor therein and this led me to examine into the possible unrecognized sources of bad breath not hitherto properly treated. As a result of this study I came to the conclusion that the respiratory tracts themselves were a very important and yet unrecognized source of bad breath and realized that all the mouth washes and gargles and medicants taken into the mouth would not eliminate the cause of bad breath from these areas. Numerous tests with well known solid and liquid remedies proved that they did not remove the odor and as a result I realized that something must be done to effectively treat all the respiratory tracts if the breath was to be properly and completely sweetened. Consequently my invention has developed into a method and apparatus in the use of which the entire respiratory tract is effectively treated as well as the mouth and the throat. It consists in the inhalation into the respiratory tracts of an aromatic odor. Preferably it involves the inhalation into the mouth of an aromatic odor with as little outside air as possible and with the nose preferably closed and the filling of the throat and lungs with this odor and followed by the exhalation of the odor from the lungs and throat through the nasal passages preferably with the mouth closed. Preferably the sweetening agent is a concentrated substance preferably with the odor of some flavoring odor such as cinnamon, peppermint, and the like and with small volatility. This agent is preferably impregnated into some carrier substance or body and placed into a container or cartridge having inlet and discharge which can be easily manipulated to be opened and closed at will and the device is of such size and shape to permit it being carried in the pocket and used quickly, easily and unobtrusively at any and all times. Tests have proven that even with the most foul and strong breath, a few inhalations from this device taken as above described will completely remove the last trace of bad breath and this sweetening effect will last at least for several hours.

Therefore the invention involves a method and a simple, easily applied device for the purpose of eliminating bad breath which involves a well defined procedure to achieve clean breath. Preferably the odor is drawn first through the mouth into the throat and lungs since if the odor is drawn through the nose first there is not enough aromaticity to properly saturate the mouth and lung cavities. If outside air is too freely admitted to mingle with the air that has been saturated with the odor then there is so much attenuation that the odor loses its effectiveness.

In the particular application of the device and the method the first step is to put the mouth piece of the device tightly to the lips and drawing air in through the inlet passages past and over the surface of the impregnated carrier into the mouth, throat and lungs by breathing or inhaling deeply. After a few inhalations of this character, the breath may be held for a few seconds and then exhaled through the nose passages with the mouth preferably closed. This by repeated tests with very strong breath contamination has proved to completely remove bad breath in a few seconds. The method is harmless, non-medicinal, no beverage substances are used, nothing has to be drunk, chewed or gargled and the device can be used so easily and simply and quickly that its use is practically unnoticeable at any time.

Further and more specific objects, features and advantages will more clearly appear from a consideration of the specification hereinafter when taken in connection with the accompanying drawing which forms part of the specification and which illustrates a present preferred form which the device may assume.

In the drawing, which illustrates a present preferred form which the device may assume to practically apply the method, Fig. 1 is a side elevation partly in section through one form of the device;

Figure 1:
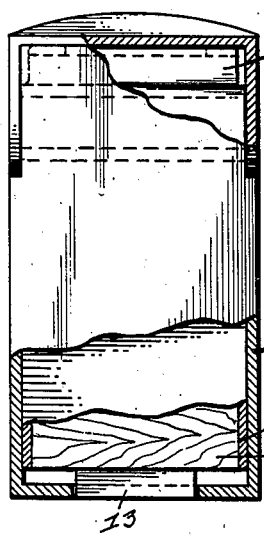

As shown in the drawing the form of the invention shown in the first four figures, involves a pocket device somewhat like a cigar lighter, with an outer casing 10 and an inner nested slidable casing or cartridge 11.

Figure 2:
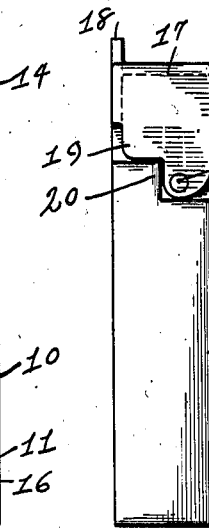
Fig. 2 is an end elevation thereof with the cover closed.
Figure 3:
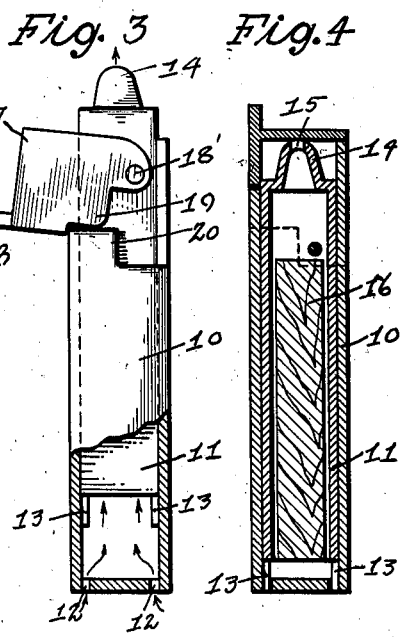
Fig. 3 is a similar view with parts broken away, showing the cover opened.
Figure 4:
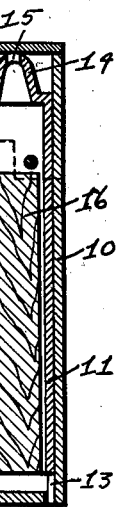
Fig. 4 is a vertical transverse section through the device shown in Fig. 2.
Figure 5:
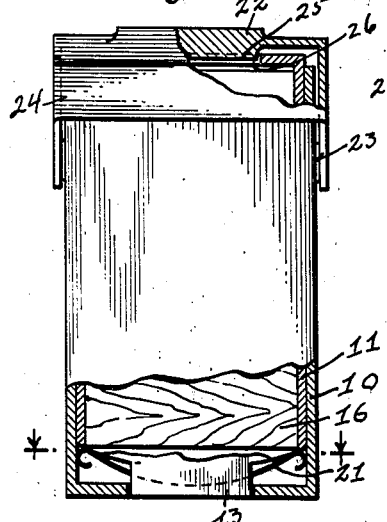
Fig. 5 is a side elevation, partly in section, through another form of the device.
Figure 6:
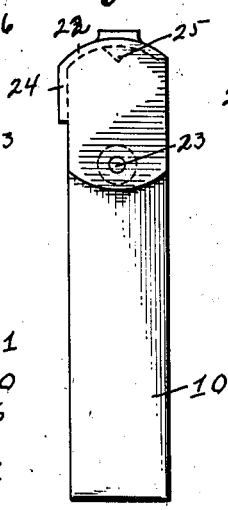
Fig. 6 is an end elevation thereof, showing the cover in closed position.

Within the casing 11 there is disposed a carrier in the form of a unitary sheet-like wafer, such as 16 which may be fashioned from any suitable, highly porous material, such as wood or purified wood pulp material, which can be impregnated with the desired aromatic material. The bottom of the outer casing 10 is provided with air vents or openings 12 into which projecting plugs 13 on the bottom of the casing 11 extend when the inner casing 11 is in the normal retracted position shown in Fig. 1, thus preventing inflow of air. The top of the inner casing 11 is provided with a tapered snout having a discharge orifice 15 and is adapted to extend up through the open upper end of the outer casing 10, as shown in Fig. 3. A cover member 17 is pivoted at 18' to the side walls of the inner casing and has an operating lip 18 which permits it to be swung from one position to another. When in the closed position shown in Figs. 2 and 4 the top surface of the cover snugly bears against the discharge opening 15 and closes it. When the cover is swung to swing it from its closed position shoulders 19 and 20 on the cover and the adjacent outer casing 10 will act as sort of cams or wedges to lift the inner casing slightly out of the outer casing as shown in Fig. 3 and advance the discharge orifice to a position where it is convenient to the mouth of the user. As the inner casing is lifted, the plugs 13 are raised from the vents 12 and air can flow or be drawn in through them and past the surface of the carrier member 16 which may be made slightly narrower along at least one or two lateral surfaces so that the air drawn up by the inhalation of the user will become thoroughly saturated with the aromatic odor being employed before it enters the mouth of the user. When the cover is shut the inner casing can then be moved down to normal position.

Figures 7, 8:
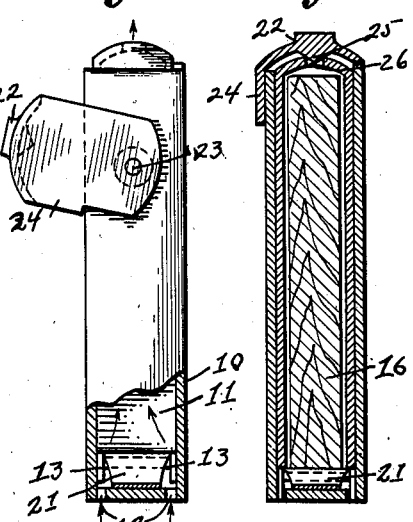
Fig. 7 is a similar view, partly broken away, with the cover in opened position.
Fig. 8 is a vertical longitudinal section through the device shown in Fig. 6; and, Fig. 9 is a cross horizontal section taken on the line 9—9 of Fig. 5.
Figure 9:
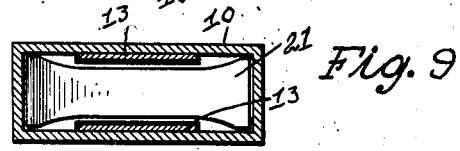

In the form shown in the remaining figures the structure is quite similar except that in this form the cover is pivoted to the outside casing 10 at 23 and has a depressed lug or tit 25 which extends into the discharge opening 15 more effectively to close it. Also in this form the bottom of the inner casing is engaged by a spring member 21 which tends to press it upwardly and move it out slightly of the outer casing but this can take place only when the cover member 24 has been swung to the side as shown in Fig. 7. When this is done then the discharge opening or snout is advanced as shown in Fig. 7 where it is available to the lips of the user. In this form also the air vents are automatically opened when the inner casing and cartridge are advanced and closed when they are restored to normal position.

In both of these forms of the invention as relating to the device, it will be appreciated that there is provided a simple compact pocket device which is normally closed so that the aromatic substance impregnating the carrier will last a maximum length of time and the casing can be carried readily without any inconvenience to the user. To use the device the person merely takes it out of his pocket and flips back the cover in either form with his finger whereupon the snout is projected slightly and the opening 15 is convenient to the lips which are then pressed tightly against the snout and a deep breath or two is taken preferably with the nostril closed drawing the impregnated air deeply into the mouth throat and lungs. The air is thoroughly impregnated because the air vents have been opened by the lifting of the inner casing and the removal from the vents of the plugs 13. The air thus admitted in a controlled manner flows past the relatively large surfaces areas of the cartridge and pick up strong and large proportions of the aromatic odor contained in the carrier 16.

After the breath is held for a few seconds it is then exhaled through the nose preferably with the mouth closed.

Thus the respiratory tracts and passages are thoroughly impregnated and treated with a concentrated aromatic odor which is not scented enough to stay on the breath and be in some cases as objectionable and noticeable as the bad breath itself. This device and method requires nothing to chew or gargle, is not medicinal in character and not edible. It can be unobtrusively used at all times and is conveniently carried in the pocket. The aromatic is strong enough to eliminate the bad breath when imposed upon the membranes of the respiratory tracts but is not strong enough to injure them in any way.

In both of the described forms of the invention, it will be understood that the inner casing has its relatively lower end open, whereby upon separation of the inner and outer casings, the carrier wafer may be bodily withdrawn when through continued use the aromatic material with which the wafer was initially impregnated has lost its effectiveness, whereupon a refill or fresh wafer may be substituted therefor prior to reassembly of the casing parts.

While the invention has been described in detail and with respect to preferred present forms thereof, it is not to be limited to such details and forms since many changes and modifications may be made in the invention without departing from the spirit and scope of the invention in its broadest aspects. Hence it is desired to cover any and all forms and modifications of the invention which come within the language or scope of any one or more of the appended claims.

What I claim as my invention, is:

1. A device for treating bad breath which comprises an outer casing open at one end, an inner casing slidable within the outer casing and having at one end thereof a mouth piece provided with a discharge opening, the other end of said inner casing and the related end of said outer casing having air inlet openings, a cover means on one of said casings normally closing the discharge opening, a relatively large area carrier for aromatic material of low volatility disposed in the inner casing, and means cooperating with the cover and one of the casings to move the inner casing partly out of the outer casing when the cover is moved to uncover the discharge opening.

2. A device for treating bad breath which comprises an outer casing having an open end and air vents in the other end, an inner casing nested within the outer casing and having its inner end open and providing a mouth piece having a discharge opening, a cover to close the discharge opening, a relatively large area carrier for aromatic material of low volatility disposed in the inner casing, and means cooperating with the cover to move the inner casing within the outer casing when the cover is moved to uncover the discharge opening.

3. A device for treating bad breath which comprises an outer casing having an open upper end and air vents in its lower end, an inner casing nested therein and having its inner end open and its outer end providing a mouth piece having a discharge opening, a cover to close the discharge opening, closure projections on the inner end of the inner casing to close the air vents in the outer casing when the inner casing is in normal position, a relatively large area carrier for aromatic material of low volatility disposed in the inner casing, and means cooperating with the cover to move the inner casing within the outer casing when the cover is moved to uncover the discharge opening whereby the air vents are then opened.

4. A device for treating bad breath which comprises an outer casing having an open upper end and air vents in its lower end, an inner casing nested therein and having its inner end open and its outer end providing a mouth piece having a discharge opening, a cover pivoted to the inner casing and adapted normally to close the discharge opening, a relatively large area carrier for aromatic material of low volatility disposed in the inner casing, and cooperating shoulders on the cover element and the outer casing to act as cam surfaces to lift the inner casing from the outer one slightly when the cover is moved pivotally to uncover the discharge opening whereby the air vents are uncovered and vent closing means on the lower end of the inner casing adapted normally to close the air vents when the inner casing is in its normal nested position.

5. A device for treating bad breath which comprises an outer casing having an open upper end and air vents in its lower end, an inner casing nested therein and having its inner end open and its outer end providing a mouth piece having a discharge opening, a relatively large area carrier for aromatic material of low volatility disposed in the inner casing, a cover pivoted to the outer casing and adapted normally to extend over the top of the inner casing and close the discharge opening therein, vent-closing projections on the lower end of the inner casing, and resilient means within the outer casing and beneath the lower end of the inner casing to lift the inner casing partly from the outer casing when the cover is moved to uncover the discharge opening whereby the vent-closing projections are removed from the air vents as the discharge opening is uncovered.

6. A device for treating bad breath which comprises an outer casing open at one end, an inner casing slidable within the outer casing and providing at one end a mouth piece having a discharge opening, a cover means on one of said casings, the other end of the inner casing and the related end of the outer casing having air inlet openings, means cooperating with the cover and one of the casings to move the inner casing partly out of the outer casing when the cover is moved to uncover the discharge opening, and a relatively large area carrier within the inner casing impregnated with an aromatic material of low volatility.

7. A device for treating bad breath which comprises an outer casing having an open end and air vents in the other end, an inner casing nested within the outer casing and having its inner end open and its outer end providing a mouth piece having a discharge opening, a cover to close the discharge opening, means cooperating with the cover to move the inner casing within the outer casing when the cover is moved to uncover the discharge opening, and a relatively large area carrier within the inner casing and impregnated with an aromatic material of low volatility.

8. A device for treating bad breath which comprises an outer casing having an open upper end, and air vents in its lower end, an inner casing nested therein and having its inner end open and its outer end provided with a discharge opening, a cover to close the discharge opening, closure projections on the inner end of the inner casing to close the air vents in the outer casing when the inner casing is in normal position, means cooperating with the cover to move the inner casing within the outer casing when the cover is moved to uncover the discharge opening whereby the air vents are then opened, and a substance within the inner casing and impregnated with an aromatic odor.

9. A device for treating bad breath which comprises an outer casing having an open upper end and air vents in its lower end, an inner casing nested therein and having its inner end open and its outer end provided with a discharge opening, a cover pivoted to the inner casing and adapted normally to close the discharge opening, and cooperating shoulders on the cover element and the outer casing to act as cam surfaces to lift the inner casing from the outer one slightly when the cover is moved pivotally to uncover the discharge opening whereby the air vents are uncovered, and vent closing means on the lower end of the inner casing adapted normally to close the air vents when the inner casing is in its normal nested position, and a substance within the inner casing and impregnated with an aromatic odor.

10. A device for treating bad breath which comprises an outer casing having an open upper end and air vents in its lower end, an inner casing nested therein and having its inner end open and its outer end provided with a discharge opening, a cover pivoted to the outer casing and adapted normally to extend over the top of the inner casing and close the discharge opening therein, vent-closing projections on the lower end of the inner casing, and resilient means within the outer casing and cooperating with the inner casing to lift the inner casing partly from the outer casing when the cover is moved to uncover the discharge opening whereby the vent-closing projections are removed from the air vents as the discharge opening is uncovered, and a substance within the inner casing of the nature of an aromatic odor.

11. A device for treating bad breath which comprises an outer casing open at one end, an inner casing slidable within the outer casing and having at one end thereof a mouthpiece provided with a discharge opening, the other end of said inner casing and the related end of said outer casing having air inlet openings, a cover means on one of said casings normally closing the discharge opening, a relatively large area carrier for aromatic material of low volatility disposed in the inner casing, and means including said cover for sliding the inner casing partly out of the outer casing.

12. A device for treating bad breath which comprises an outer casing open at one end, an inner casing slidable within the outer casing and having at one end thereof a mouthpiece provided with a discharge opening, the other end of said inner casing and the related end of said outer casing having air inlet openings and said inner casing including means normally closing the air inlet opening of the outer casing, a cover means pivotally carried by one of said casings and normally closing the discharge opening, a relatively large area carrier for aromatic material of low volatility disposed in the inner casing and means including said cover for effecting partial movement of the inner casing out of the outer casing whereby to uncover the inlet and discharge openings.

LOUIS W. SCHAAFF.